June 20, 1939.  J. W. O'DELL  2,163,007
SUCKER ROD WIPER
Filed March 12, 1938
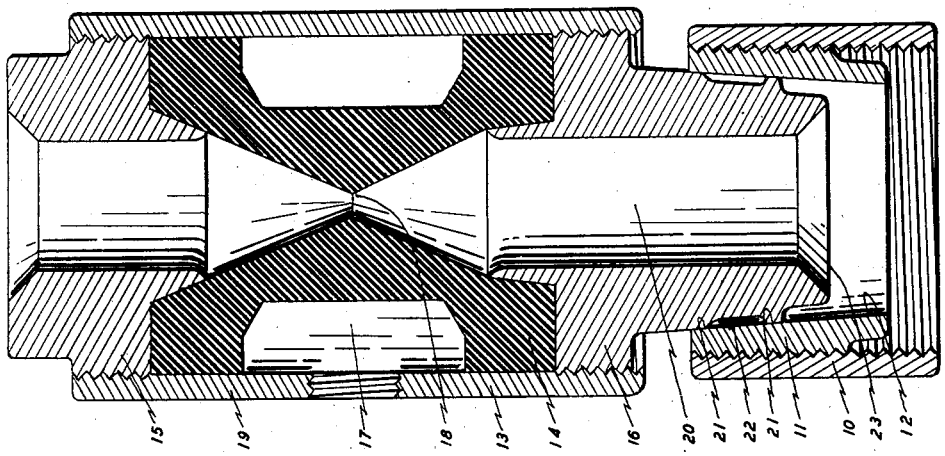
JOHN W. O'DELL
INVENTOR
ATTORNEY Patented June 20, 1939

2,163,007

UNITED STATES PATENT OFFICE 2,163,007

SUCKER ROD WIPER

John W. O'Dell, Oildale, Calif.

Application March 12, 1938, Serial No. 195,484

3 Claims. (Cl. 166—14)

The object of the invention is to provide a sucker rod wiper which will not be damaged by engagement with the pump in pulling the last stand of sucker rods.

In pumping oil wells it becomes necessary at times to withdraw the sucker rods by which the pump is actuated. If, as is often the case, the oil which is being produced is heavy and viscous, much oil adheres to the rods as they come to the surface and creates a nuisance by being blown onto the operators and draining on the device floor. It is therefore common practice to provide a wiping means by which this excess oil is caused to flow back into the tubing as the rod string is pulled.

The wipers heretofore used have had the disadvantage that they are arranged to be screwed firmly into the tubing head and are seriously damaged or destroyed if the pump is drawn forcibly against them. This imposes on the operator the necessity of drawing the last stand of tubing very slowly and carefully.

In my improved design the wiping element is retained in the tubing head with sufficient force to cause it to pass over the rod boxes but is capable of detaching itself and riding up on top of the pump without being damaged.

In the attached drawing, the figure illustrates a preferred form of the invention in vertical center section.

Referring to the figure, 10 represents a portion of a collar or other fitting on the upper end of the tubing. Into this collar is screwed a sleeve 11 which, in this form, is tapered internally as at 12.

The wiper proper consists of four parts: a sleeve 13, a rubber wiping element 14, and two retaining rings 15 and 16. The wiping element, which is formed of rubber, is externally grooved as at 17 to increase its expansibility. The opening 18 must be of such dimensions as will cause the element to contract around the sucker rod and wipe off the oil, and its expansibility must be such as to permit the rod boxes to pass through without damaging it. The openings 19 and 20 must of course be sufficiently large to permit the boxes to pass through.

The lower end of the lower retaining ring is externally tapered as at 21 and may desirably be grooved as at 22 to reduce the area of contact with internal taper 12. When this fitting is placed over the upper end of the rod and gently tapped to a firm bearing, it will remain in place as the rod boxes pass through and expand opening 18 but will be disengaged without damage if the rapid withdrawal of the pump causes it to strike the lower end 23 of the lower retaining ring.

I claim as my invention:

1. A sucker rod wiper comprising: a body member having a bore therethrough adapted to permit the passage of sucker rod boxes; a wiping element attached to said body, said element being expansible to permit said boxes to pass and contractile to wipe the surface of said rods between said boxes; a supporting member arranged to be fastened within the upper end of a pump tubing string, and means for retaining said body member in said supporting member when said boxes pass through said wiping element and for releasing said body member from said supporting member when the lower end of said body member is engaged by an object too large to pass through said bore, said means consisting of mating, downwardly converging faces of solid metal formed within the upper end of said supporting member and on the lower end of said body member.

2. A sucker rod wiper comprising a cylindrical sleeve internally threaded at each end; an expansible wiping ring fixed within said sleeve; an upper and a lower retaining ring screwed into the ends of said sleeve and engaging the ends of said wiping ring; a nozzle projected downwardly from said lower retaining ring, said nozzle being externally tapered, and a supporting ring adapted to screw into a tubing collar and internally tapered to engage the external taper of said nozzle.

3. In a sucker rod wiper having a resilient wiping ring within a metallic body and a supporting member adapted to be attached to the upper end of the well tubing, a projection from the lower end of said body having an externally tapered face, and a seat formed in the upper end of said supporting member mating with said externally tapered face, said face and said seat being smooth and having a degree of taper suitable for firmly but releasably wedging said body within said supporting member.

JOHN W. O'DELL.